Patented May 16, 1933

1,908,700

UNITED STATES PATENT OFFICE

MERYL ETHERTON, OF KANSAS CITY, MISSOURI

SOLDER-SEAL

No Drawing. Application filed May 14, 1930. Serial No. 452,520.

This invention relates to a composition of matter for sealing leaks in hot water circulation systems of internal combustion engines, especially for automobile and tractor radiators, engine blocks, pumps, and other containers of heated water.

Flaxseed meal prepared from ground flaxseed by removing a large percentage of the hulls and leaving the oil intact, has long been used as an agent to stop leaks in hot water circulating systems of internal combustion engines and automobiles. However, flaxseed meal becomes water soaked, swells and quickly reaches a gummy state when the water is heated to the average temperature found in the circulating systems of internal combustion engines. Some of the meal particles are carried to the leak by the flow of water out through the leak, where they catch on the edges of the hole and keep accumulating until they form a barrier against the water. This barrier partially dries from contact with the outside air and provides only a temporary repair.

The two main objections of the flaxseed meal as an agent for stopping leaks in hot water circulating systems, of automobiles and internal combustion engines, are, as follows:
(1) Only a small quantity of the meal circulates with the water and remains in suspension, the remainder settling to the bottom of the circulating system and, due to its gummy condition, clings together and has a tendency to become so lodged in the passages as to obstruct the water circulation. (2) The barrier formed across the leak by the accumulation of the small particles of meal, is not permanent as it is of an oily nature and does not reach such a state of hardness as to permanently withstand the road jars and vibrations of the average automobile or internal combustion engine.

One of the objects of the present invention is to provide a composition which may be deposited in the form of a powder in water of a radiator or other container when found to be leaky.

Another object of the invention is to provide a composition for sealing leaks in the hot water circulating system without clogging the passages or retarding water circulation.

Still another object of the invention is to provide a composition for sealing leaks in hot water circulating systems which will form a solid barrier and a substantially permanent repair at the place or places of leakage, more quickly than ordinary.

I attain the above stated objects by placing in the hot water circulating system, after same has been partially filled with water, a composition composed of ground flaxseed, with a large percentage of the hulls removed and the oil left intact in the meal, tobacco dust, carnauba wax, and powdered aluminum in about the following proportions:

| | Pounds |
|---|---|
| Flaxseed meal (with oil intact) | 55 |
| Tobacco dust | 25 |
| Carnauba wax | 10 |
| Aluminum (pulverized fine) | 10 |

The proportions of the ingredients mentioned are those found to be very efficient. However, I desire it to be understood that the above proportions may be somewhat varied without affecting the efficiency and action of the compound, and I do not wish to limit myself in this respect.

In preparing the composition, the carnauba wax is first melted and a small quantity of water is added while heat is still being applied to produce steam, the resulting action being to churn the wax into a foamy or frothy condition. The pulverized aluminum is now added and the combination allowed to cook until the wax is thoroughly impregnated with the aluminum, the whole being in a frothy, foamy or spongy condition. While the wax and aluminum are in the condition described, they are chilled by pouring the mixture into cold water. The material quickly hardens, forming a synthetic aluminum solder of a light, hard, porous and water-proof nature that readily floats in water. The synthetic aluminum solder is first ground into a powder and then thoroughly mixed with the flaxseed meal. The tobacco dust is then added and the composition thoroughly mixed. The product is now ready to be added to the hot water circulating system.

Approximately two ounces of this composition are required for mending leaks in the hot water circulating system of an automobile or the average internal combustion engine. The composition is placed in the radiator after the water in the circulating system has been heated by the engine to approximately 180° F. and allowed to circulate with the water. About five minutes are required to substantially seal all leaks in the system.

The tobacco dust not only preserves the freshness of the flaxseed meal by preventing a wormy condition, but acts as a colloid in the heated water and in effect embalms or surrounds the particles of flaxseed meal and prevents them from clinging together by circulating between them. This separation increases the suspension of the meal in the water and prevents it from lodging in and obstructing the water circulating system.

Carnauba wax is of a hard, tough, and durable nature. It has long been used as a water proofing agent in leather dressings. When in a melted condition, it is soluble in vegetable oils of equal temperature and solidifies quickly upon cooling. When carnauba wax is impregnated with powdered aluminum, through the aid of heat and steam as described, and is then suddenly chilled, it forms a synthetic aluminum solder of a hard, porous and water-proof nature that readily floats in water and melts when the water in the circulating system reaches approximately 180° F., but does not go into solution with the water. It adheres to the particles of flaxseed meal by joining with the oil contained therein, lodges in the leak with the particles of meal, quickly hardens upon being cooled by contact with the outside air, and forms a solid and more permanent water-proof barrier of high aluminum content more quickly than ordinary.

It has been found that the synthetic aluminum solder made as described may be used to form a stop-leak in water buckets and other vessels not subjected to heat, and that the material may be applied to small leaks by the heat of a match or the like.

From the above description, it will be apparent that while I have described and claimed the preferred embodiment of the invention, I reserve the right to make all changes properly falling within the spirit and scope of the appended claims.

I claim:

1. A process for the manufacture of synthetic solder comprising the melting and heating of a water non-soluble wax, the addition of powdered aluminum to said wax while the latter is hot and the sudden chilling of the resulting mixture.

2. The process of making a stop leak comprising the boiling of a mixture of water-insoluble wax and a finely ground metal in the presence of water to produce a porous mass, and the subsequent cooling of such mass to retain its porous characteristics.

3. The process of making a stop leak comprising the boiling of a mixture of water-insoluble wax and finely ground aluminum in the presence of water to produce a porous mass, and the subsequent cooling of such mass to retain its porous characteristics.

4. The process of making a stop leak comprising the boiling of a mixture of carnauba wax and a finely ground metal in the presence of water to produce a porous mass, and the subsequent cooling of such mass to retain its porous characteristics.

5. The process of making a stop leak comprising the boiling of a mixture of carnauba wax and finely ground aluminum in the presence of water to produce a porous mass, and the subsequent cooling of such mass to retain its porous characteristics.

In testimony whereof I affix my signature.

MERYL ETHERTON.